United States Patent

Isogai (10) Patent No.: US 9,963,263 B2
(45) Date of Patent: May 8, 2018

(54) CONTAINER SEALING DEVICE (71) Applicant: Tokan Kogyo Co., Ltd., Tokyo (JP)

(72) Inventor: Takamitsu Isogai, Tokyo (JP)

(73) Assignee: Tokan Kogyo Co., Ltd., Tokyo (JP)

( * ) Notice: Subject to any disclaimer, the term of this patent is extended or adjusted under 35 U.S.C. 154(b) by 208 days.

(21) Appl. No.: 14/762,410

(22) PCT Filed: Jan. 24, 2014

(86) PCT No.: PCT/JP2014/051580
§ 371 (c)(1),
(2) Date: Jul. 21, 2015

(87) PCT Pub. No.: WO2014/115857
PCT Pub. Date: Jul. 31, 2014

(65) Prior Publication Data
US 2015/0353247 A1    Dec. 10, 2015

(30) Foreign Application Priority Data

Jan. 25, 2013  (JP) .................................. 2013-012710

(51) Int. Cl.
*B65D 5/74*  (2006.01)
*B65D 47/10*  (2006.01)
(Continued)

(52) U.S. Cl.
CPC ........... *B65D 5/746* (2013.01); *B65D 47/106* (2013.01); *B65D 47/123* (2013.01);
(Continued)

(58) Field of Classification Search
CPC .............. B65D 1/0246; B65D 41/0471; B65D 47/106; B65D 47/123; B65D 5/749;
(Continued)

(56) References Cited

U.S. PATENT DOCUMENTS 2,581,690 A * 1/1952 Moehle .................. F16B 33/02
411/308
3,487,442 A * 12/1969 Rossmann .............. F16B 33/02
220/288

(Continued)

FOREIGN PATENT DOCUMENTS

CN    1297411 A    5/2001
CN    1400949 A    3/2003
(Continued)

OTHER PUBLICATIONS

International Preliminary Report on Patentability for International Application No. PCT/JP2014/051580 dated Jul. 28, 2015.
(Continued)

*Primary Examiner* — J. Gregory Pickett
*Assistant Examiner* — Gideon Weinerth
(74) *Attorney, Agent, or Firm* — Knobbe Martens Olson & Bear LLP (57) ABSTRACT

The sealing device 100 of a container 1 is provided with an inner plug 10 and an upper closure 20. The inner plug 10 has a separation part 12 for forming an opening by separation. A first screwing part 51 for attachment of the upper closure 20 is provided between the inner plug 10 and the upper closure 20. The upper closure 20 has an inner cylinder part 20c which is a support part catching a separation part 12 by a second screwing part 52 in opening the plug and separating the separation part 12 from the inner plug 10. The second screwing part 52 is in a reverse thread relation with respect to the first screwing part 51 and has a barb-shape which facilitates pushing the separation part 12 into the inner cylinder part 20c rather than withdrawing the separation part from the inner cylinder part 20c.

8 Claims, 7 Drawing Sheets (51) Int. Cl.
 B65D 47/12 (2006.01)
 B65D 51/22 (2006.01)
 B65D 1/02 (2006.01)
 F16B 33/02 (2006.01)
(52) U.S. Cl.
 CPC .......... B65D 51/228 (2013.01); *B65D 1/0246* (2013.01); *B65D 2251/0015* (2013.01); *B65D 2251/0031* (2013.01); *F16B 33/02* (2013.01)
(58) Field of Classification Search
 CPC ...... B65D 2251/0028; B65D 2251/009; B65D 2251/0031; B65D 2251/0015; B65D 51/228; F16B 33/02
 USPC ..... 215/256, 250, 252, 253, 48, 49, 329, 44, 215/334; 220/277, 278; 222/501, 494, 222/541.9, 541.6, 541.4
 See application file for complete search history.

(56) References Cited

U.S. PATENT DOCUMENTS

| | | | | |
|---|---|---|---|---|
| 3,640,416 A * | 2/1972 | Temple | .............. | B65D 41/0471 215/329 |
| 3,682,345 A * | 8/1972 | Baugh | ................ | B65D 41/0471 215/330 |
| 3,696,957 A * | 10/1972 | Van Baarn | ............. | B65D 41/48 215/320 |
| 4,024,952 A * | 5/1977 | Leitz | ................. | B65D 51/2878 206/221 |
| 4,125,201 A * | 11/1978 | Birch | ................ | B65D 41/0407 215/330 |
| 4,190,171 A * | 2/1980 | Kulle | ..................... | B65D 41/04 215/318 |
| 4,196,819 A * | 4/1980 | Fontanaud | ............. | B65D 41/04 215/253 |
| 4,202,455 A * | 5/1980 | Faulstich | ............. | B65D 1/0246 215/45 |
| 4,461,394 A * | 7/1984 | Sendel | ............... | B65D 41/0471 215/330 |
| 4,586,861 A * | 5/1986 | McKewan | .............. | F16B 39/30 411/311 |
| 4,674,643 A * | 6/1987 | Wilde | .................... | B65D 41/04 215/252 |
| 4,697,715 A * | 10/1987 | Beruvides | .......... | B05B 11/3045 215/330 |
| 4,742,929 A * | 5/1988 | Desai | ..................... | B65D 41/04 215/332 |
| 4,793,475 A * | 12/1988 | Itzel | ................... | B65D 51/2814 206/219 |
| 5,020,683 A * | 6/1991 | Strassheimer | ..... | B65D 41/0421 215/354 |
| 5,494,174 A * | 2/1996 | Rohr | ...................... | B65D 55/02 215/330 |
| 5,678,735 A * | 10/1997 | Guglielmini | ......... | B65D 47/063 215/253 |
| 6,247,605 B1 * | 6/2001 | Fujie | .................... | B65D 47/103 215/254 |
| 6,367,640 B1 * | 4/2002 | Julian | ................. | B65D 1/0246 215/329 |
| 6,382,462 B1 * | 5/2002 | Ostergaard-Nielsen | ................. | B65D 5/749 222/1 |
| 6,422,412 B1 * | 7/2002 | Sagawa | ................. | B65D 5/748 220/277 |
| 6,688,988 B2 * | 2/2004 | McClure | ................. | B23G 7/02 408/220 |
| 6,726,689 B2 * | 4/2004 | Jackson | ............. | A61B 17/7032 411/411 |
| 6,913,157 B2 * | 7/2005 | Oh | ......................... | B65D 41/04 215/329 |
| 7,694,835 B1 * | 4/2010 | Montgomery | ....... | B65D 1/0246 215/329 |
| 7,735,664 B1 * | 6/2010 | Peters | .................. | B65D 1/0246 215/252 |
| 7,766,178 B2 * | 8/2010 | Robinson | ............... | B65D 1/023 215/232 |
| 8,235,232 B2 | 8/2012 | Isogai et al. | | |
| 9,254,941 B2 * | 2/2016 | Galownia | .......... | B65D 41/0414 |
| 2001/0015355 A1 | 8/2001 | Adams et al. | | |
| 2005/0263476 A1 * | 12/2005 | Harrison | ............. | B29C 49/0073 215/44 |
| 2006/0086688 A1 * | 4/2006 | Tang-Lee | ............. | B65D 1/0246 215/44 |
| 2009/0308834 A1 * | 12/2009 | Isogai | ................ | B65D 47/0838 215/329 |
| 2014/0190973 A1 * | 7/2014 | Kerman | ................. | B65D 35/44 220/278 |
| 2015/0321798 A1 * | 11/2015 | Isogai | ................. | B65D 47/106 215/253 |
| 2015/0353247 A1 * | 12/2015 | Isogai | .................... | B65D 5/746 215/252 |
| 2016/0167849 A1 * | 6/2016 | Isogai | ................ | B65D 51/22 215/296 |
| 2016/0244224 A1 * | 8/2016 | Isogai | ................. | B65D 47/123 |
| 2016/0288967 A1 * | 10/2016 | Isogai | .................... | B65D 47/36 |

FOREIGN PATENT DOCUMENTS

| | | |
|---|---|---|
| CN | 102114937 A | 7/2011 |
| DE | 3404403 | 8/1985 |
| EP | 2266883 | 12/2010 |
| EP | 2266883 A1 | 12/2010 |
| FR | 2770832 A1 | 5/1999 |
| JP | 55-20603 | 5/1980 |
| WO | WO 96/02431 | 2/1996 |
| WO | WO 99/42375 | 8/1999 |
| WO | WO 2007/126062 | 11/2007 |

OTHER PUBLICATIONS

Yugen Kaisha Nonkawa Shoji, Microfilm of the specification and drawings annexed to the request of Japanese Utility Model Application No. 21421/1974 (Laid-open No. 112544/1975), Sep. 13, 1975.
Manabe,Tamotsu, Microfilm of the specification and drawings annexed to the request of Japanese Utility Model Application No. 71243/1976 (Laid-open No. 163457/1977), Dec. 10, 1977.
Office Action dated Apr. 22, 2016 in Chinese Patent Application No. 201480005995.9.
Extended European Search Report dated Aug. 5, 2016 in European Patent Application No. 14742855.1.
Office Action dated Jun. 21, 2017 in European Patent Application No. 14742855.1.
Office Action dated Jul. 12, 2017 in Japanese Patent Application No. 2014-558637.

* cited by examiner

CONTAINER SEALING DEVICE

CROSS-REFERENCE TO RELATED APPLICATIONS

This application is the U.S. National Phase under 35 U.S.C. § 371 of International Application PCT/JP2014/051580, filed Jan. 24, 2014, which claims priority to Japanese Patent Application No. JP 2013-012710, filed Jan. 25, 2013, the entirety of which is incorporated herein by reference.

TECHNICAL FIELD

The present invention relates to a container sealing device to be attached to a bottle-shaped container.

BACKGROUND ART

Figure 1:
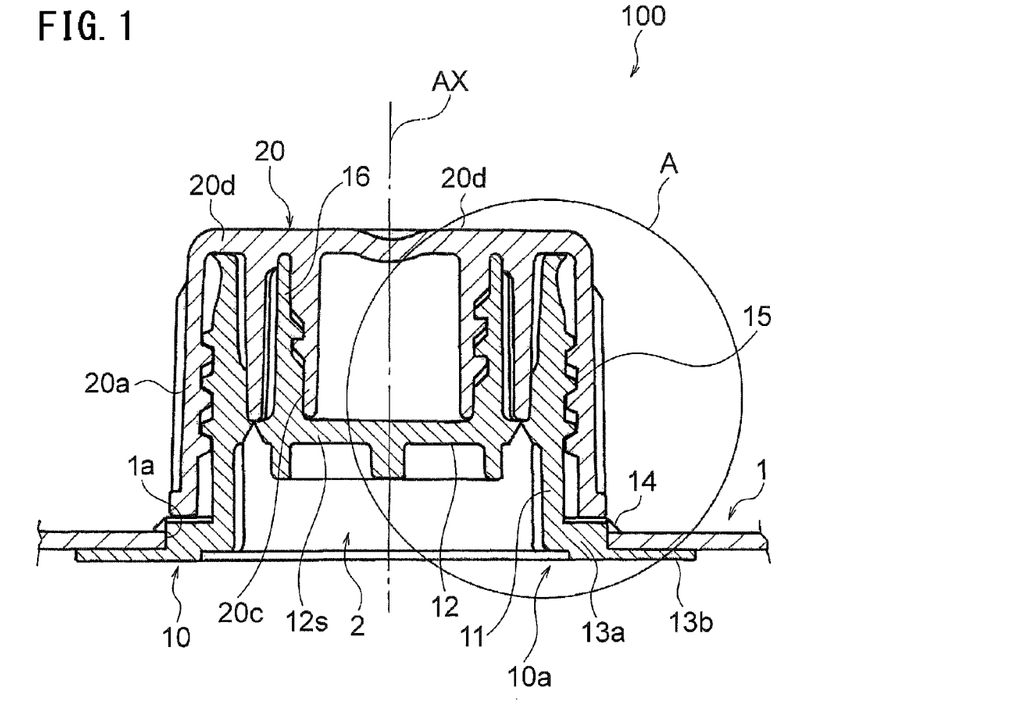
FIG. 1 is a cross-sectional view for explaining a container sealing device according to an embodiment of the present invention.
Figure 2:
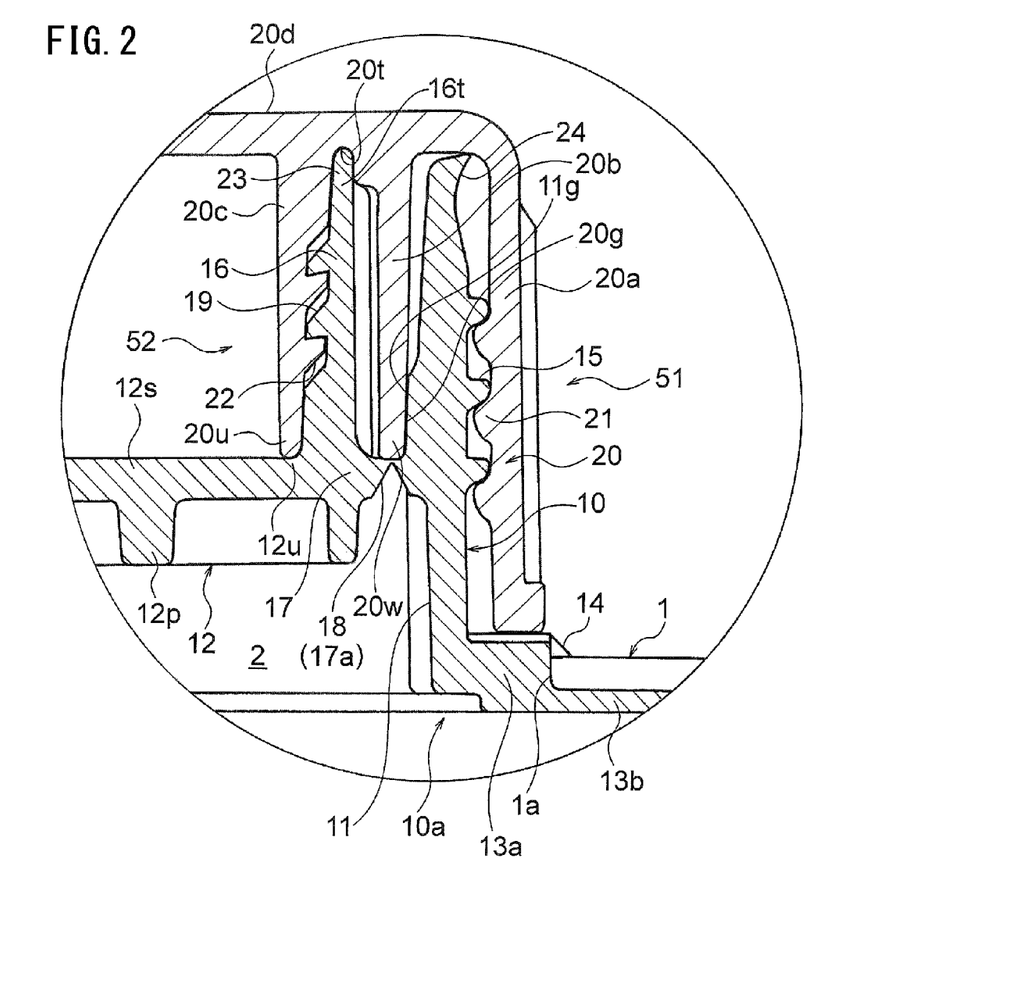
FIG. 2 is a partially enlarged view illustrating A part in FIG. 1 in an enlarged manner.

As a known cap structure (sealing device) used for a container with a upper closure, there is a structure which is provided with an inner plug and an upper closure, and in which a cylindrical part fitted with an opening part of a bottle and a separation part continuously provided on an inner side thereof via a score are provided in the inner plug (refer to FIGS. 1 and 2 in Patent Literature 1).

In this cap structure, the upper closure is preliminarily engaged (screwed) with the separation part of the inner plug through, for example, reverse threads. As a result, a movement difference can be generated between the separation part of the inner plug and the upper closure by screwing backward so as to remove the upper closure from the opening part (forward thread) of the bottle when opening the plug, whereby the separation part is separated from the cylindrical part of the inner plug and the separation part is held by the upper closure. According to this cap structure, the upper closure can be easily opened only by rotating the upper closure so as to be loosened, and the separation part separated by opening of the plug is held on an inner cylinder on an upper end of the upper closure, and thus the separation part after separation can be made to function as a seal, whereby the separation part does not become so-called rubbish.

Incidentally, in assembling of the cap structure in Patent Literature 1, the inner plug is considered to be previously screwed into the inner cylinder of the upper closure, for example, and then, the upper closure is considered to be assembled to the opening part of the bottle together with the inner plug. Here, from a viewpoint of preventing screwing-back or loose rotation of the inner plug, there can be a method of achieving engagement (forced screw-engaging by non-screwing) with each other so that a thread on an inner wall of an outer periphery of the upper closure rides over the thread of the opening part of the bottle, for example. In this case, a height of the thread on the inner wall of the outer periphery of the upper closure and a height of the thread on the opening part of the bottle cannot be made so high. Namely, when these threads are formed high, a large force is required for engaging the upper closure and the opening part during assembling, which makes assembling difficult. On the other hand, when the height of the thread is made low in order to facilitate assembling, an engaging force between the upper closure and the opening part of the bottle becomes weak, and it becomes difficult to screw back the upper closure against resistance when opening the plug. Furthermore, when a relatively large clearance is formed between the thread on the inner wall of the outer periphery of the upper closure and the thread of the separation part, there may be a risk that the upper closure can be easily removed.

On the other hand, as another assembling method, the inner plug is previously fitted in a mouth part of the bottle, and then the upper closure is screwed with the mouth part of the bottle, and the inner cylinder of the upper closure is engaged with the separation part of the inner plug, with the result that the cap can be assembled to the mouth part of the bottle. In this case, when the thread is lowered so that the thread of the inner cylinder of the upper closure reliably rides over the thread of the separation part, there may be cases where the engaging force between the inner cylinder of the upper closure and the separation part becomes weak and the separation part cannot be separated when opening the plug. Moreover, since a relatively large clearance is formed between the thread on the inner cylinder of the upper closure and the thread of the separation part, there is also a risk that the separation part is loosened and is easily removed from the upper closure.

CITATION LIST

Patent Literature

PTL 1: International Publication No. WO2007/126062

SUMMARY OF INVENTION

An object of the present invention is to provide a container sealing device which facilitates engagement between an upper closure and a separation part of an inner plug and which can obtain a sufficient engaging force facilitating separation of the separation part.

In order to solve the aforementioned problem, the container sealing device according to the present invention is a container sealing device provided with an inner plug and an upper closure and enabling attachment and detachment of the upper closure by a first screwing part provided between the inner plug or the container and the upper closure, wherein: the upper closure has a support part catching a separation part provided in the inner plug by a second screwing part in opening the plug or opening of the seal and separating the separation part from the inner plug; and the second screwing part is in a reverse thread relation with respect to the first screwing part and has a barb-shaped protrusion which facilitates pushing the separation part into the support part rather than withdrawing the separation part from the support part.

According to the aforementioned container sealing device, since the second screwing part has the reverse thread with respect to the first screwing part and has the barb-shaped protrusion which facilitates pushing the separation part into the support part rather than withdrawing the separation part from the support part, when the upper closure and the inner plug or the container are combined and set, the barb-shaped protrusion of the second screwing part in the reverse thread relation allows pushing one of the separation part and the support part into the other by causing the first screwing part to function to thereby screw the upper closure to the inner plug or the container, and thus the separation part can be engaged with and fixed to the support part by forced screw-engaging of the support part and the separation part. Moreover, in opening the plug, the upper closure is rotated so as to be screwed back and the first screwing part is loosened, but regarding the second screwing part, since the barb-shaped protrusion acts in a biting direction and the second screwing part is tightened to be meshed and the second screwing part is locked, whereby the separation part is reliably fixed to the support part, the separation part can be separated from a body part of the inner plug easily and rapidly, and the separation part is not easily removed from the upper closure any longer after the separation, that is, after the opening of the plug, which ensures reliable holding.

In a specific aspect or viewpoint of the present invention, in the aforementioned container sealing device, the inner plug has a body part and a separation part that forms an opening by being separated from the body part, and the upper closure is attached to the container so as to cover the inner plug.

In another viewpoint of the present invention, the protrusion is a thread having a cross-section biased to an anti-screwing direction along an axial center of the inner plug on a tip end side. Here, the anti-screwing direction means a relative traveling direction in screwing back so that a member of interest is to be loosened.

In still another viewpoint of the present invention, the second screwing part has an engagement surface inclined toward the anti-screwing direction and also has a set of protrusions having a thickness at a tip end part smaller than a thickness of a base part. Namely, the engagement surface of each protrusion is inclined downward toward the axial center direction of the inner plug. Here, the engagement surface means a surface of the protrusion where the protrusion of the support part and the protrusion of the separation part are brought into contact with each other when the separation part is moved upward by the upper closure with respect to the body part of the inner plug to thereby be separated or removed. When the upper closure and the inner plug are assembled, one protrusion can easily ride over the other protrusion since one set of protrusions have shapes that can be easily deformed in the anti-screwing direction, whereby the assembling work is facilitated. On the other hand, after the support part and the separation part reach a forced screwed state by pushing-in utilizing the shape of barb as described above, releasing is reliably prevented, and riding over the protrusion is also reliably prevented.

In another viewpoint of the present invention, the support part has a first inner cylinder part extending downward from a lower surface of a ceiling wall of the upper closure, the separation part has a second inner cylinder part extending upward from a sealing body connected to the body part of the inner plug and surrounding the first inner cylinder part from the periphery, and the second screwing part has a male thread formed on an outer side surface of the first inner cylinder part of the support part and a female thread formed on an inner side surface of the second inner cylinder part of the separation part. In this case, since the separation part fixed to the support part covers the support part, the separation part or an opening has a relatively large diameter.

In still another viewpoint of the present invention, a stopper regulating a mutual assembling interval is provided between the separation part of the inner plug and the upper closure. In this case, in a state where the separation part and the support part can be positioned by the stopper, since the separation part can be fixed to the support part, that is, to the upper closure, opening of the plug for separating the separation part is facilitated, and a risk that the separation part may be removed from the upper closure after the separation can be reduced.

In still another viewpoint of the present invention, the stopper is provided at least at either one of a lower end of the support part and an upper end of the second inner cylinder part extending upward from the sealing body provided on the separation part. In this case, support of the separation part is made stable, and a sealing function can be given to the stopper.

In still another viewpoint of the present invention, a score is provided between the body part of the inner plug and the separation part. In this case, sealing of the inner plug by the separation part is made reliable, and separation of the separation part is also facilitated.

BRIEF DESCRIPTION OF DRAWINGS

FIGS. 3a and 3b are views for explaining an essential part of the container sealing device according to an embodiment, in which FIG. 3a illustrates a second screwing part and FIG. 3b is a view for explaining a shape of a thread of the screwing part.

DESCRIPTION OF EMBODIMENTS

FIGS. 1 to 5 illustrate an embodiment of a container sealing device according to the present invention.

The illustrated sealing device 100 is constituted of an inner plug 10 forming an opening part 2 of a paper package or the like which is a container 1, and an upper closure 20 attached to the inner plug 10 so as to cover the opening part 2 of the inner plug 10.

The inner plug 10 is an integrally molded product made of a resin and is provided with a body part 10a locked by or fixed to the container 1 and a separation part 12 to be separated after opening the plug.

The body part 10a of the inner plug 10 forms an extraction port of a content of the container 1, that is, the opening part 2 and has a cylindrical part 11 which is a cylindrical member extending along an axial center AX. The body part 10a has a thick disc part 13a extending outward in a radial direction on a lower end and a thin annular plate part 13b extending outward in the radial direction from a peripheral surface of the disc part 13a. On the peripheral surface of the disc part 13a, protrusions 14 are formed extending outward in the radial direction at equal intervals at 4 to 8 portions along with the peripheral direction. These protrusions 14 are formed at intervals with respect to the annular plate part 13b in the direction along the axial center AX, a peripheral edge of a hole 1a formed in the container 1 is press-fitted in the interval so as to lock the inner plug 10 by the container 1. On the cylindrical part 11 of the inner plug 10, a male thread 15 to be screwed to the upper closure 20 is formed on an outer peripheral surface.

As illustrated in FIG. 2 and the like, the separation part 12 of the inner plug 10 is provided with a sealing body 12s having a disc shape arranged on a bottom part and a cylindrical inner cylinder part (second inner cylinder part) 16 extending upward from an outer edge of this sealing body 12s. A boundary part on an outer peripheral side between the outer edge of this sealing body 12s and a lower end part of the inner cylinder part 16 is connected to the body part 10a of the inner plug 10 by an annular connection part 17. An annular notch 18 is formed on a lower surface of the connection part 17. This notch 18 serves as a part of a score 17a which is cut off in opening of the plug. A cross-shaped protrusion 12p is provided on the lower surface side of the sealing body 12s, in order to facilitate screwing of the inner plug 10 into the upper closure 20 by rotating the inner plug 10 including the separation part 12 when the inner plug 10 is assembled to the upper closure 20. The inner cylinder part 16 is arranged concentrically and separately inside a cylindrical part 11 on an outer side. A female thread 19 serving as a reverse thread relative to the male thread 15 is formed on an inner peripheral surface of the inner cylinder part 16.

The upper closure 20 is an integrally molded product made of a resin and is provided with a cylindrical peripheral wall part 20a, a large-diameter inner cylinder part 20b and a small-diameter inner cylinder part (first inner cylinder part) 20c concentrically with the peripheral wall part 20a therein, and they are continuously provided by a ceiling wall 20d. A female thread 21 screwed with the male thread 15 formed on the outer peripheral side surface of the cylindrical part 11 of the inner plug 10 is formed on an inner peripheral surface of the peripheral wall part 20a, and a male thread 22 screwed with the female thread 19 formed on the inner peripheral side surface of the cylindrical part 11 of the separation part 12 provided in the inner plug 10 is formed on an outer peripheral surface of the small-diameter inner cylinder part 20c.

In the above, the male thread 15 of the cylindrical part 11 of the inner plug 10 and the female thread 21 of the peripheral wall part 20a of the upper closure 20 constitute a first screwing part 51 which enables attachment and detachment of the upper closure 20 with respect to the inner plug 10. Furthermore, the female thread 19 of the inner cylinder part (second inner cylinder part) 16 of the inner plug 10 and the male thread 22 of the small-diameter inner cylinder part (first inner cylinder part) 20c of the upper closure 20 constitute a second screwing part 52 for tightening and fixing the separation part 12 of the inner plug 10 to the small-diameter inner cylinder part 20c of the upper closure 20. Namely, the small-diameter inner cylinder part 20c of the upper closure 20 functions as a support part for catching the separation part 12 by the second screwing part 52 and separating the separation part 12 from the inner plug 10. The first screwing part 51 and the second screwing part 52 are in a mutually reverse thread relation. Namely, when the first screwing part 51 is screwed back so as to be loosened by rotating the peripheral wall part 20a of the upper closure 20 in a counterclockwise direction when seen from an upper side, the small-diameter inner cylinder part (first inner cylinder part) 20c of the upper closure 20 is rotated in a counterclockwise direction when seen from the upper side, and the second screwing part 52 is tightened. Here, for example, the screwing direction or the like of the second screwing part 52 will be described in detail. For the inner cylinder part 16 of the inner plug 10, the upper side along the axial center AX is the tread direction for screwing with the small-diameter inner cylinder part 20c of the upper closure 20 by rotation in the counterclockwise direction when seen from a lower side, whereas a lower side along the axial center AX is the anti-screwing direction for screwing back with the small-diameter inner cylinder part 20c. Furthermore, for the small-diameter inner cylinder part 20c, the lower side along the axial center AX is the screwing direction for screwing with the inner cylinder part 16 by rotation in the counterclockwise direction when seen from the upper side, whereas the upper side along the axial center AX is the anti-screwing direction for screwing back with the inner cylinder part 16.

Figure 3A:
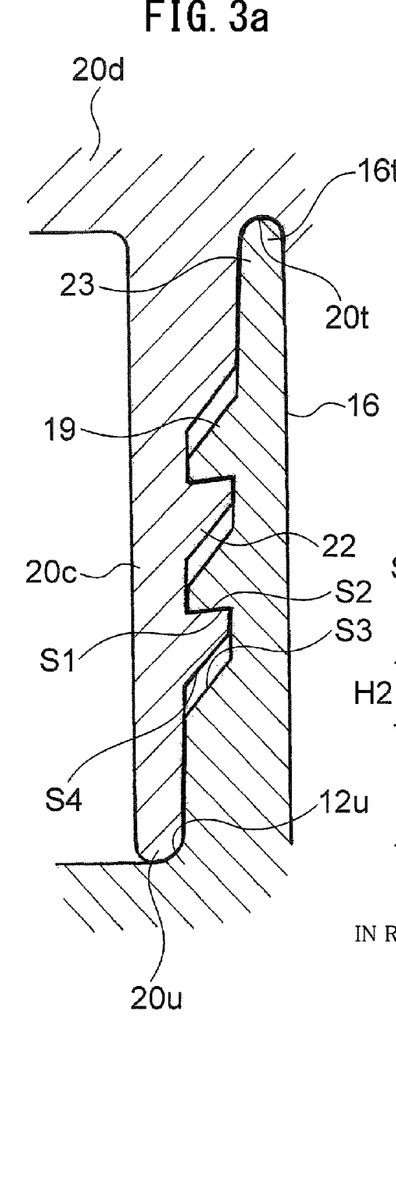
Figure 3B:
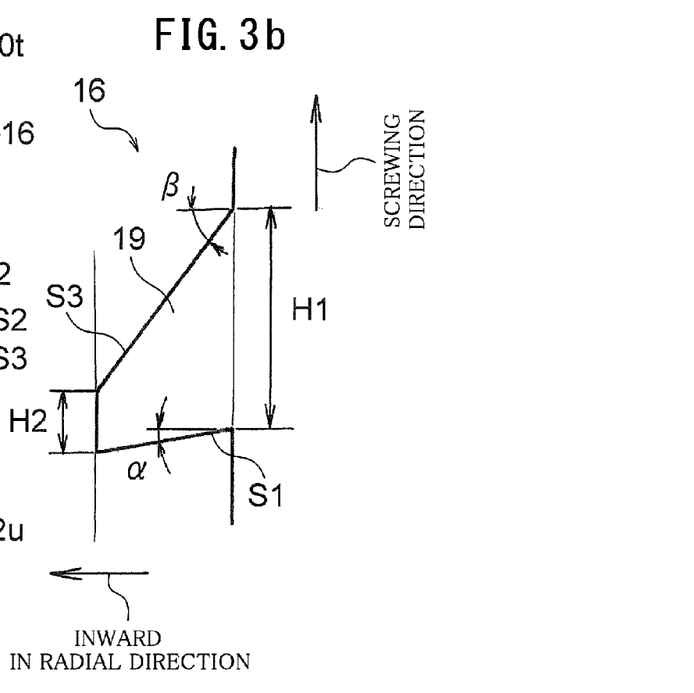

Note that the second screwing part 52, that is, the female thread 19 formed on the separation part 12 of the inner plug 10 and the male thread 22 formed on the small-diameter inner cylinder part 20c of the upper closure 20 meshed with that are barb-shaped protrusions which facilitate pushing the separation part 12 into the small-diameter inner cylinder part 20c rather than withdrawing the separation part 12 from the small-diameter inner cylinder part (support part) 20c. Specifically, as illustrated in FIGS. 3a and 3b, the female thread (protrusion) 19 constituting the second screwing part 52 serves as a thread having a cross-sectional shape biased to the anti-screwing direction (lower side) along the axial center AX of the inner plug 10 on the tip end side in a cross-section passing through the axial center AX. In another viewpoint, in the female thread (protrusion) 19, an engagement surface S1 on the anti-screwing side with the male thread 22 when the separation part 12 is displaced upward is formed with downward inclination (angle α) toward an inside in the radial direction of the inner plug 10, and a thickness (H2) of the tip end part is set smaller than a thickness (H1) of the base part. Namely, in the female thread (protrusion) 19, an engagement surface S3 on the screwing side is inclined (angle β>α) downward toward the inside in the radial direction of the inner plug 10 larger than the engagement surface S1. Here, the angle α of the engagement surface S1 on the lower side is negative in an illustrated state since the upper side is assumed to be positive on the basis of or with reference to a root side of the female thread 19, and the angle β of the engagement surface S3 on the upper side is positive in an illustrated state since the lower side is assumed to be positive on the basis of the root side of the female thread 19. On the other hand, the male thread (protrusion) 22 constituting the second screwing part 52 is a thread having a cross-sectional shape biased to the anti-screwing direction (upper side) along the axial center AX of the inner plug 10 on the tip end side in the cross-section passing through the axial center AX. In the male thread (protrusion) 22, although not shown in detail, an engagement surface S2 with the female thread 19 is formed with upward inclination (angle α) toward an outside in the radial direction of the inner plug 10, and a thickness of the tip end part is set smaller than a thickness of the base part. Namely, in the male thread (protrusion) 22, an engagement surface S4 on the screwing side is inclined downward toward the inside in the radial direction of the inner plug 10 larger than the engagement surface S2. As is obvious from the above, the female thread 19 provided on the inner cylinder part 16 of the inner plug 10 and the male thread 22 provided on the small-diameter inner cylinder part 20c of the upper closure 20 are formed point-symmetrically to a longitudinal cross-section. As a result, in the female thread 19 of the inner cylinder part 16, both the engagement surfaces S1 and S3 are inclined toward the anti-screwing direction or a downward direction along the axial center AX of the inner plug 10 on the basis of the root or proximal side of the thread, while in the male thread 22 of the small-diameter inner cylinder part 20c, and both the engagement surfaces S2 and S4 are inclined toward the anti-screwing direction or an upward direction along the axial center AX of the inner plug 10 on the basis of the root or proximal side of the thread.

As illustrated in FIG. 2, a tip end part 16t of the inner cylinder part 16 of the inner plug 10 is brought into contact with a lower surface 20t of the ceiling wall 20d of the upper closure 20 exposed between the base part of the large-diameter inner cylinder part 20b and the base part of the small-diameter inner cylinder part 20c of the upper closure 20. Similarly, a tip end part 20u of the small-diameter inner cylinder part 20c of the upper closure 20 is brought into contact with an inner-surface corner part 12u of the separation part 12 of the inner plug 10. The tip end part 16t of the inner cylinder part 16 and the tip end part 20u of the small-diameter inner cylinder part 20c function as stoppers for regulating a mutually assembling interval between the separation part 12 of the inner plug 10 and the upper closure 20. A lower end part 20w of the large-diameter inner cylinder part 20b provided on the upper closure 20 is in close contact with the connection part 17 of the inner plug 10. As a result, after the separation part 12 is separated from the body part 10a, the large-diameter inner cylinder part 20b covers the periphery of the separation part 12 and is brought into close contact with the separation part 12. Furthermore, when sealing after opening the plug, a lower-part peripheral surface 20g of the large-diameter inner cylinder part 20b is brought into close contact with a center-part inner peripheral surface 11g of the cylindrical part 11 and can keep the inside of the container 1 liquid-tight.

Figure 4:
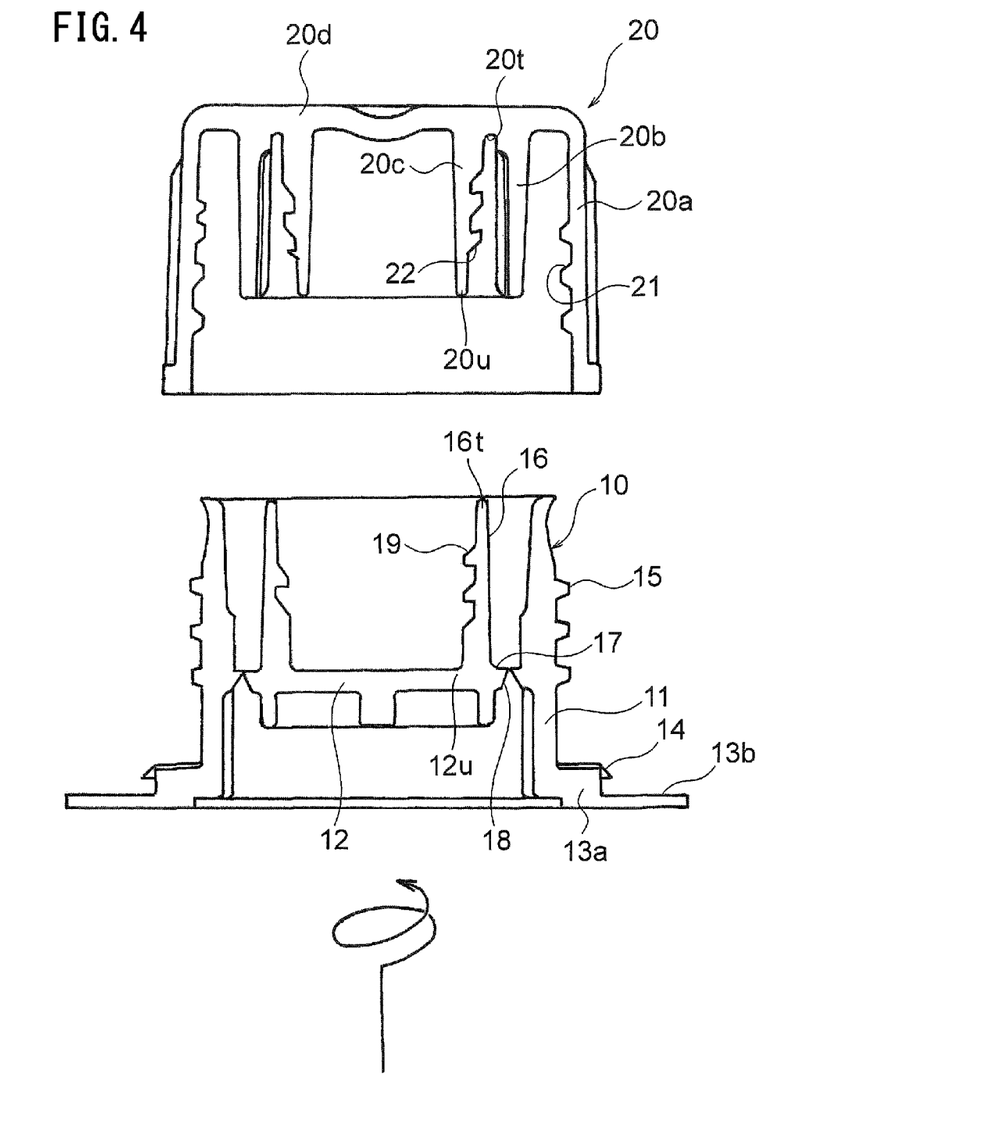
FIG. 4 is a view for explaining an assembling work of an inner plug and an upper closure in the container sealing device according to the embodiment.

In FIG. 4, the inner plug 10 and the upper closure 20 constituted as described above are screwed with each other by engaging the female thread 21 of the upper closure 20 and the male thread 15 of the inner plug 10, and by rotating the inner plug 10 in a clockwise direction when seen from the inner plug 10 side or by rotating the upper closure 20 in the clockwise direction when seen from the upper closure 20 side. At that time, the female thread 19 of the inner plug 10 and the male thread 22 of the upper closure 20, formed at other portions are formed with reverse threads, but since the threads 19 and 22 are formed having a shape that can be easily deformed when being pushed in as described above, the inner plug 10 and the upper closure 20 ride over the threads 19 and 22 while mutually deforming and they are meshed or engaged with each other. The small-diameter inner cylinder part 20c of the upper closure 20 is fitted so as to be pushed into the inner plug 10 until the tip end part 16t of the inner cylinder part 16 is brought into contact or is close to the lower surface 20t of the ceiling wall 20d of the upper closure 20 or fitted so as to be pushed into the inner plug 10 until the tip end part 20u of the small-diameter inner cylinder part 20c is brought into contact with or is close to the inner-surface corner part 12u of the separation part 12 of the inner plug 10 (refer to FIG. 2).

In a state where the inner plug 10 and the upper closure 20 are engaged with each other as described above, the interval between the inner plug 10 and the upper closure 20 is adjusted, and as illustrated in FIGS. 2 and 3a, the tip end part 16t of the inner cylinder part 16 is accommodated in a recess part 23 formed at a base part between the large-diameter inner cylinder part 20b and the small-diameter inner cylinder part 20c. In addition, a lip part 24 formed at the tip end of the cylindrical part 11 is positioned in a state brought into contact with the lower surface 20t of the ceiling wall 20d of the upper closure 20.

Then, the sealing device 100 (the inner plug 10 and the upper closure 20) assembled as described above is inserted into a hole 1a of the container 1 such as a paper packet or the like from the back side as illustrated in FIG. 1, the outer peripheral surface of the disc part 13a of the inner plug 10 is fitted with an inner peripheral surface of the hole 1a and is bonded to the container 1 by adhesion or the like.

Hereinafter, an opening operation or unsealing operation of the cap structure of the aforementioned embodiment will be described by referring to FIGS. 1, 5 and the like.

First, as illustrated in FIG. 1, the upper closure 20 is at a reference position or an initial position (a state of being screwed into the depth) before a rotating operation of the screwing part, while the separation part 12 and the cylindrical part 11 are in a connected state, and the opening part 2 of the container 1 is in a sealed state.

From this state, the upper closure 20 is moved upward along with rotating the upper closure 20 in a loosening direction that is, in a counterclockwise direction. At this time, as illustrated in FIG. 2, since the separation part 12 is engaged with the upper closure 20 through reverse threads, further tightening is not performed or tightening is slightly progressed and a lock state of inhibiting movement to the direction of the upper closure 20 is reached. Namely, the separation part 12 is moved upward together with the upper closure 20 while rotating in the counterclockwise direction when seen from above with respect to the body part 10a. Since a stress concentrates on the notch 18 or the score 17a of the inner plug 10 during that time, the connection part 17 is sheared, the separation part 12 is removed from the cylindrical part 11 and the plug is opened.

In this state, in the separation part 12, as illustrated in FIGS. 2 and 3a, the engagement surface S2 which is an upper surface of the male thread 22 of the separation part 12 is brought into contact with the engagement surface S1 which is a lower surface of the female thread 19 of the cylindrical part 11, and moreover, the tip end part 16t of the inner cylinder part 16 is brought into contact with the lower surface 20t in the recess part 23, with the result that the separation part 12 is maintained in a lock state by the screwing and is held by the upper closure 20.

Figure 5:
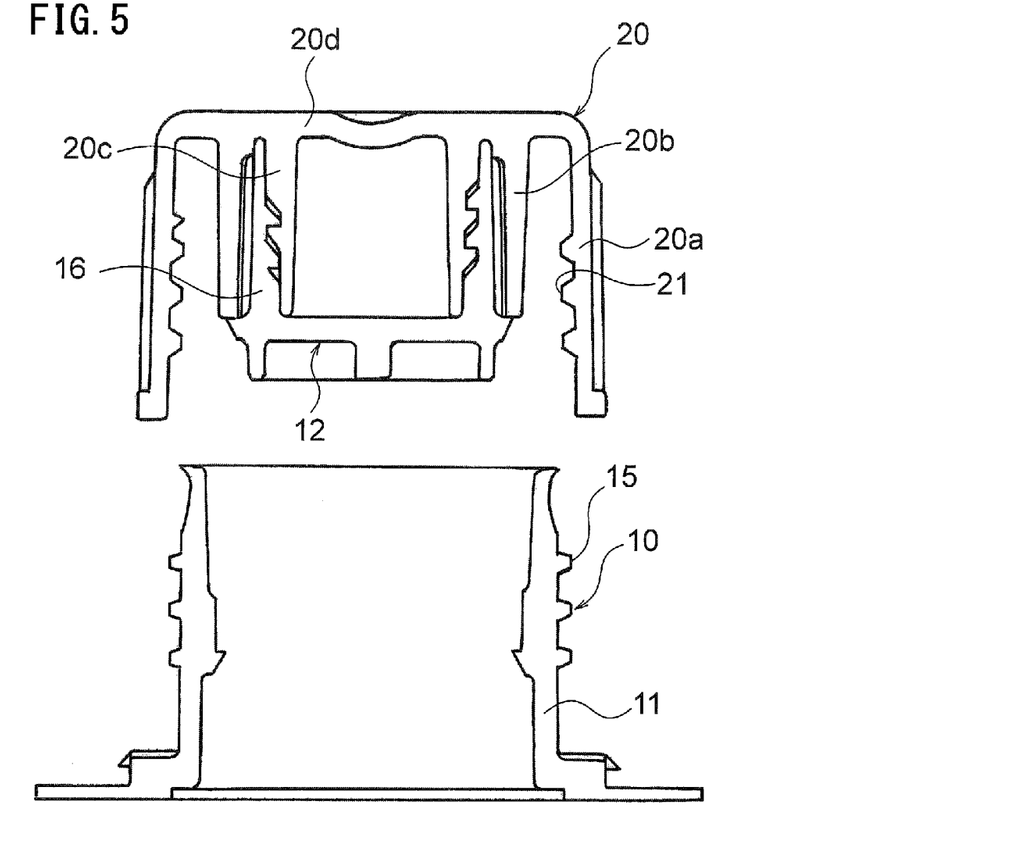
FIG. 5 is a view illustrating a state after opening of the container sealing device according to the embodiment.

Furthermore, the upper closure 20 separates from the cylindrical part 11 by rotating the upper closure 20 in the loosening direction, as illustrated in FIG. 5, whereby the contents in the container 1 can be poured. At this time, the separation part 12 is secured by the upper closure 20 and is in a lock state with respect to the upper closure 20, and thus there is no risk of removal. Namely, once being opened, the separation part 12 fixed to the inner plug 10 side is fixed to the upper closure 20 side.

A state after opening of the plug will be explained by referring to FIG. 2. By screwing the female thread 21 of the upper closure 20 with the male thread 15 of the inner plug 10 and by rotating the upper closure 20 in the clockwise direction, the lip part 24 formed at the upper end of the cylindrical part 11 is brought into contact with the lower surface 20t of the ceiling wall 20d of the upper closure 20, and the lower-part peripheral surface 20g of the large-diameter inner cylinder part 20b is brought into close contact with the center-part inner peripheral surface 11g of the cylindrical part 11. As a result, the opening part 2 is sealed. Note that, in FIG. 2, the score 17a is not cut off, but to be accurate, once the upper closure is opened, the score 17a is put into a cut-off state.

According to the container sealing device described above, the second screwing part 52 is in the reverse thread relation with respect to the first screwing part 51, and has a barb-shaped protrusion (female thread 19 and male thread 22) which facilitates pushing in rather than withdrawing the separation part 12 from the small-diameter inner cylinder part 20c which is the support part. Therefore, when the upper closure 20 and the inner plug 10 are assembled and set in advance, as a result of causing the first screwing part 51 to function and of screwing the inner plug 10 into the upper closure 20, the barb-shaped protrusion (female thread 19 and male thread 22) of the second screwing part 52 in the reverse thread relation allows pushing either one of the separation part 12 and the small-diameter inner cylinder part 20c into the other, and the separation part 12 can be engaged with and fixed to the small-diameter inner cylinder part 20c by forced screw-engaging between the small-diameter inner cylinder part 20c and the separation part 12. Furthermore, in opening of the plug, the upper closure 20 is rotated so as to be screwed back, to thereby loosen the first screwing part 51, but in the second screwing part 52, tightening of the second screwing part 52 is performed so that the barb-shaped protrusion (female thread 19 and male thread 22) acts in a biting direction and is meshed with, whereby the second screwing part 52 is locked. Therefore, the separation part 12 is reliably fixed to the small-diameter inner cylinder part 20c, the separation part 12 can be separated from the body part 10a of the inner plug 10 easily and rapidly, and after separation, that is, after opening of the plug, the separation part 12 cannot be easily removed from the upper closure 20, whereby holding is made reliable.

Hereinbefore, the container sealing device according to the present embodiment has been described, but the container sealing device according to the present invention is not limited to the above. For example, in the present embodiment, specifications such as a pitch, a winding number, a thread height and the like of the male thread 15 and the female thread 21 constituting the first screwing part 51 can be appropriately modified in accordance with application. Furthermore, the specifications such as a pitch, a winding number, a thread height and the like of the male thread 22 and the female thread 19 constituting the second screwing part 52 can also be appropriately modified in accordance with application.

Moreover, the large-diameter inner cylinder part 20b of the upper closure 20 can be omitted, and the similar function can be given to the inner cylinder part (second inner cylinder part) 16 of the separation part 12. In this case, a seal part in close contact with the cylindrical part 11 after opening of the plug can be provided at an appropriate portion in the small-diameter inner cylinder part 20c or apart extending close to the small-diameter inner cylinder part 20c.

The inner cylinder part 16 of the inner plug 10 and the small-diameter inner cylinder part 20c of the upper closure 20 can be switched inside and outside. Also in this case, the male thread of the inner cylinder part 16 and the female thread of the small-diameter inner cylinder part 20c constitute the second screwing part 52 in the reverse thread relation with respect to the first screwing part 51.

Figure 6:
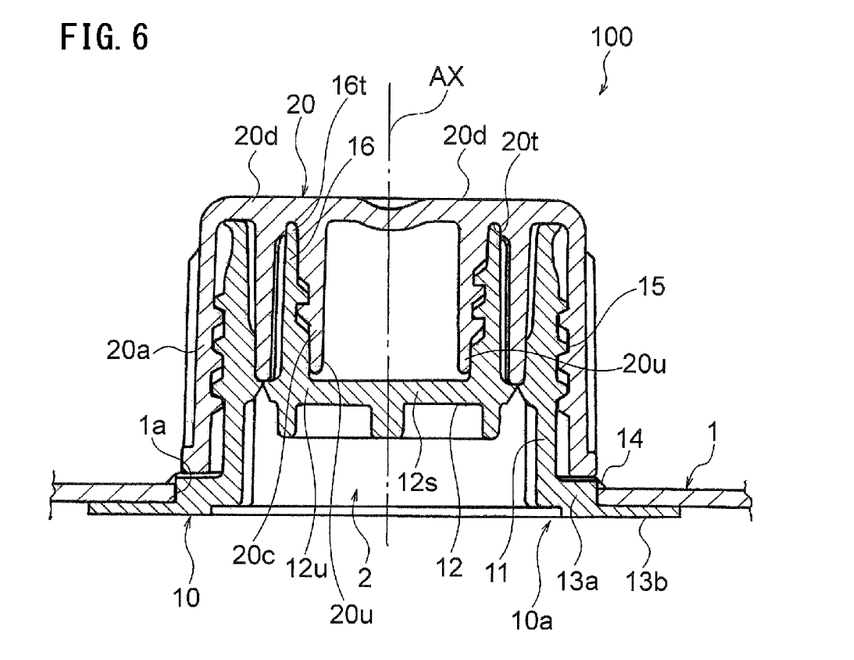
FIG. 6 is a cross-sectional view for explaining a container sealing device according to a modification.

As illustrated in FIG. 6, as a state before opening of the plug, the tip end part 20u of the small-diameter inner cylinder part 20c of the upper closure 20 can be spaced away from the inner-surface corner part 12u of the separation part 12. Alternatively, although not shown, the tip end part 16t of the inner cylinder part 16 of the inner plug 10 can be spaced away from the lower surface 20t of the ceiling wall 20d of the upper closure 20. However, when either one of the tip end parts 20u and 16t is spaced away, the tip end part 20u on an inner side is preferably spaced away from the inner-surface corner part 12u from the viewpoint of preventing removal or the like of the separation part 12 by protecting the second screwing part 52 from the contents in the container.

The shape of each of the female thread 19 and the male thread 22 constituting the second screwing part 52 is not limited to the shapes exemplified in FIG. 3a and the like but may be any barb-like shape which facilitates pushing-in and can be various cross-sectional shapes. For example, a cross-sectional shape relating to the cross-section passing through the axial center AX of the female thread 19 may be appropriately biased to the lower side which is the anti-screwing direction, and it is only necessary that the positive inclination angle β of the upper engagement surface S3 from the root side toward a top part is sufficiently larger than the inclination angle α directed upward or downward (positive or negative) of the lower engagement surface S1 from the root side toward the top part. When the lower engagement surface S1 is directed upward and the inclination angle α is positive, it can also be said that the cross-sectional shape is a shape of quasi-barb. Although detailed explanation is omitted, the shape of the male thread 22 is made similar to the female thread 19 by turning upside down. Also in the aforementioned case, pushing-in between the female thread 19 and the male thread 22 can be made relatively easy.

Furthermore, the female thread 19 and the male thread 22 constituting the second screwing part 52 are not limited to those continuously and spirally formed, but can be composed of a plurality of separate parts.

Figure 7:
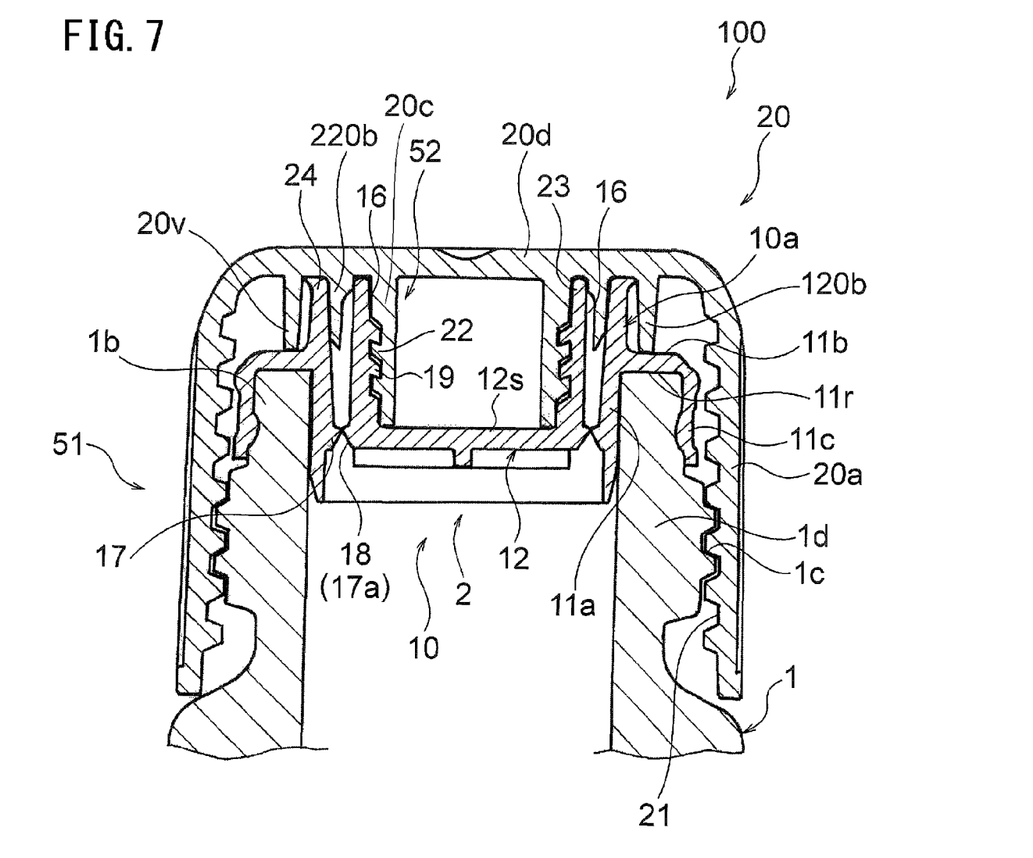
FIG. 7 is a cross-sectional view for explaining a container sealing device according to another modification.

The first screwing part 51 can be provided not only between the upper closure 20 and the inner plug 10 but also between the upper closure 20 and the container 1. The sealing device 100 in a modification exemplified in FIG. 7 is provided with the inner plug 10 locked by a tip end part 1b of a mouth part 1d provided at the container 1 by fitting or the like. The inner plug 10 is an integrally molded product made of a resin and is provided with the body part 10a locked by the container 1 and the separation part 12 connected to the body part 10a. The body part 10a forms an extraction port of the contents in the container 1 and has a cylindrical base part 11a extending along the axis, a flange part 11b extended outward in the radial direction from an intermediate-part outer peripheral surface of the cylindrical base part 11a, and an annular wall part 11c extending downward from an outer end of the flange part 11b. The cylindrical base part 11a, the flange part 11b, and the annular wall part 11c define an annular recess part 11r fitted with the mouth part 1d of the container 1. In addition, the lip part 24 extending outward is formed on an upper end of the cylindrical base part 11a.

In the above, the female thread 21 of the peripheral wall part 20a of the upper closure 20 and the male thread 1c of the mouth part 1d of the container 1 constitute the first screwing part 51 which enables attachment and detachment of the upper closure 20 with respect to the container 1. The upper closure 20 has a structure substantially similar to the structures illustrated in FIG. 1 and the like, but has a large-diameter cylinder part 120b and a middle-diameter cylinder part 220b instead of the large-diameter inner cylinder part 20b. A tip end part 20v of the former large-diameter cylinder part 120b is in contact with an upper surface of the flange part 11b of the inner plug 10 and functions as a stopper regulating the mutual assembling interval between the upper closure 20 and the body part 10a of the inner plug 10. The latter middle-diameter cylinder part 220b has a role to play in ensuring sealing after opening of the plug by being brought into close contact with the inner wall on the root side of the lip part 24 of the cylindrical base part 11a. On the other hand, since the separation part 12 in the inner plug 10 has the structure similar to the structure illustrated in FIG. 1 and the like, explanation will be omitted here.

An example of an assembling method of the sealing device 100 illustrated in FIG. 7 will be described. First, the inner plug 10 is fitted with the mouth part 1d of the container 1. After that, the upper closure 20 is screwed into the mouth part 1d of the container 1 while rotating the upper closure 20 in the clockwise direction. Namely, tightening of the first screwing part 51 is performed until the tip end part 20v of the large-diameter cylinder part 120b or the like functions as a stopper, by engaging or screwing a male thread 2 of the mouth part 1d with the female thread 21 of the upper closure 20. At this time, since the female thread 19 of the inner plug 10 and the male thread 22 of the upper closure 20 are formed having shapes which can be easily deformed when being pushed in as described above, the threads 19 and 22 ride over each other while mutually deforming and are meshed with each other. Namely, the second screwing part 52 is also put into a state of being tightened as a result of tightening of the first screwing part 51, and sealing of the sealing device 100 is completed. Opening of the sealing device 100 is similar to that described in the embodiment illustrated in FIG. 1 and the like. Although detailed explanation is omitted, as a result of rotating the upper closure 20 in the loosening counterclockwise direction, the separation part 12 is moved upward together with the upper closure 20 while rotating in the counterclockwise direction with respect to the body part 10a, whereby the connection part 17 is sheared by concentration of stress and is removed from the cylindrical base part 11a which is the cylindrical part.

What is claimed is:

1. A container sealing device provided with an inner plug and an upper closure and enabling attachment and detachment of the upper closure by a first screwing part provided between the inner plug or the container and the upper closure, wherein:
    the upper closure has a support part catching a separation part provided in the inner plug by a second screwing part for opening the plug by separating the separation part from the rest of the inner plug;
    the second screwing part is in a reverse thread relation with respect to the first screwing part;
    wherein the support part comprises a first thread forming a first portion of the second screwing part, wherein the first thread comprises a barb having surfaces angled to allow and maintain engagement of the support part to the separation part and to resist disengagement of the separation part from the support part; and
    wherein the separation part comprises a second thread forming a second portion of the second screwing part, wherein the second thread comprises a barb engaging with the barb of the first thread and having surfaces angled to allow and maintain engagement of the support part to the separation part and to resist disengagement of the separation part from the support part.

2. The container sealing device according to claim 1, wherein:
    the inner plug has a body part and the separation part that forms an opening by being separated from the body part, and
    the upper closure is attached to the container so as to cover the inner plug.

3. The container sealing device according to claim 1, wherein at least one of the support part and the separation part deform when pressed onto each other to engage the barbs.

4. The container sealing device according to claim 3, wherein the second screwing part has a set of protrusions each having a thickness of a tip end part smaller than a thickness of a base part.

5. The container sealing device according to claim 4, wherein:
    the support part has a first inner cylinder part extending downward from a lower surface of a ceiling wall of the upper closure;
    the separation part has a second inner cylinder part extending upward from a sealing body connected to the body part of the inner plug and surrounding the first inner cylinder part from a periphery; and
    the second screwing part has a male thread formed on an outer side surface of the first inner cylinder part of the support part and a female thread formed on an inner side surface of the second inner cylinder part of the separation part.

6. The container sealing device according to claim 1, wherein a stopper regulating a mutual assembling interval is provided between the separation part of the inner plug and the upper closure.

7. The container sealing device according to claim 6, wherein the stopper is provided at least at either one of a lower end of the support part and an upper end of the separation part.

8. The container sealing device according to claim 1, wherein a score is provided between the body part of the inner plug and the separation part.

* * * * *